(12) United States Patent
Zhong et al.

(10) Patent No.: US 11,948,333 B2
(45) Date of Patent: Apr. 2, 2024

(54) DISPARITY IMAGE FUSION METHOD FOR MULTIBAND STEREO CAMERAS

(71) Applicants: DALIAN UNIVERSITY OF TECHNOLOGY, Liaoning (CN); PENG CHENG LABORATORY, Guangdong (CN)

(72) Inventors: Wei Zhong, Liaoning (CN); Hong Zhang, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN); Shengquan Li, Liaoning (CN)

(73) Assignees: DALIAN UNIVERSITY OF TECHNOLOGY, Liaoning (CN); PENG CHENG LABORATORY, Guangdong (CN)

( * ) Notice: Subject to any disclaimer, the term of this patent is extended or adjusted under 35 U.S.C. 154(b) by 371 days.

(21) Appl. No.: 17/604,288

(22) PCT Filed: Mar. 5, 2020

(86) PCT No.: PCT/CN2020/077962
§ 371 (c)(1),
(2) Date: Oct. 15, 2021

(87) PCT Pub. No.: WO2021/138993
PCT Pub. Date: Jul. 15, 2021

(65) Prior Publication Data
US 2022/0207776 A1    Jun. 30, 2022

(30) Foreign Application Priority Data
Jan. 10, 2020 (CN) .......................... 202010027774.9

(51) Int. Cl.
G06T 7/80 (2017.01)
G06F 17/12 (2006.01)
G06T 5/50 (2006.01)

(52) U.S. Cl.
CPC ................ *G06T 7/85* (2017.01); *G06F 17/12* (2013.01); *G06T 5/50* (2013.01); *G06T 2207/20221* (2013.01); *G06T 2207/20228* (2013.01)

(58) Field of Classification Search
CPC ... G06T 7/85; G06T 5/50; G06T 2207/20221; G06T 2207/20228; G06T 5/002; G06T 5/20; G06T 2207/10048; G06T 7/593; G06T 7/55; G06T 7/80; G06F 17/12; G06F 17/18
USPC .......................................................... 382/154
See application file for complete search history.

(56) References Cited

U.S. PATENT DOCUMENTS 7,856,125 B2 * 12/2010 Medioni .............. G06V 20/647
   382/294
8,094,927 B2 * 1/2012 Jin .......................... G06T 15/10
   348/42

(Continued)

FOREIGN PATENT DOCUMENTS

CN    106228605 A    12/2016
CN    107917701 A  *  4/2018

(Continued)

*Primary Examiner* — Mahendra R Patel
(74) *Attorney, Agent, or Firm* — Muncy, Geissler, Olds & Lowe, P.C.

(57) ABSTRACT

A disparity image fusion method for multiband stereo cameras belongs to the field of image processing and computer vision. The method obtains pixel disparity confidence information by using the intermediate output of binocular disparity estimation. The confidence information can be used to judge the disparity credibility of the position and assist disparity fusion. The confidence acquisition process makes full use of the intermediate output of calculation, and can be conveniently embedded into the traditional disparity estimation process, with high calculation efficiency and simple and (Continued)

easy operation. In the disparity image fusion method for multiband stereo cameras proposed by the method, the disparity diagrams participating in the fusion are obtained according to the binocular images of the corresponding bands, which makes full use of the information of each band and simultaneously avoiding introducing uncertainty and errors.

5 Claims, 4 Drawing Sheets

(56) References Cited

U.S. PATENT DOCUMENTS

| | | | |
|---|---|---|---|
| 2002/0024516 A1* | 2/2002 | Chen | G06T 7/593 |
| | | | 348/E13.016 |
| 2013/0286012 A1* | 10/2013 | Medioni | G06T 7/00 |
| | | | 345/420 |
| 2018/0139431 A1* | 5/2018 | Simek | H04N 13/271 |
| 2019/0166350 A1* | 5/2019 | Park | H04N 13/156 |

FOREIGN PATENT DOCUMENTS

| | | | | |
|---|---|---|---|---|
| CN | 108010085 A | * | 5/2018 | ........... G06K 9/4671 |
| CN | 108629812 A | | 10/2018 | |
| CN | 110148181 A | * | 8/2019 | |
| CN | 110264527 A | | 9/2019 | |
| CN | 110296691 A | | 10/2019 | |
| CN | 111080724 A | * | 4/2020 | ........... G06T 3/4053 |
| CN | 111161356 A | * | 5/2020 | ............. G06T 5/007 |
| CN | 110197510 B | * | 8/2021 | ............... G06T 7/80 |
| WO | WO-2013074153 A1 | * | 5/2013 | ........... G06T 7/0024 |

* cited by examiner

DISPARITY IMAGE FUSION METHOD FOR MULTIBAND STEREO CAMERAS

TECHNICAL FIELD

The present invention belongs to the field of image processing and computer vision, relates to multi-mode binocular disparity estimation and confidence calculation, and fusion and depth calculation of disparity information obtained by a multiband sensor, particularly to a confidence calculation method and a disparity image fusion method for multiband stereo cameras.

BACKGROUND

The binocular stereo vision technology based on visible light band is developed to be relatively mature. Visible light imaging has rich contrast, color and shape information, so the matching information between binocular images can be obtained accurately and quickly so as to obtain scenario depth information. However, visible light band imaging has defects, and the imaging quality thereof is greatly reduced, for example, in strong light, fog, rain, snow or night, which affects the matching precision. Therefore, the establishment of a multiband stereo vision system by using the complementarity of different band information sources is an effective way to realize three-dimensional reconstruction of space in special environments.

For example, a visible light band binocular camera and an infrared band binocular camera are used to constitute a multiband stereo vision system, and the advantage of not being affected by fog, rain, snow and light of infrared imaging is used to make up for the deficiency of visible light band imaging so as to obtain more complete and precise depth information.

In the multiband information complementary system, it is critical to fuse the multiband information to obtain the final depth information. At present, the research and application of a multiband stereo imaging system composed of infrared and visible light bands are more common. For example, Dr. Tong Ying fused infrared and visible light information at a two-dimensional image level, used infrared band information to repair and enhance the missing visible light band information, and conducted stereo matching and three-dimensional reconstruction on the basis of the generated fusion image (Research on Several Key Techniques of 3D Reconstruction Based on Infrared and Visible Light Image Fusion [D], Tianjin University, 2015). The key step of binocular depth estimation is to obtain the position, i.e., binocular matching information, of each pixel of the left figure L in the right figure R according to pixel intensity and relative position information between pixels, and the corresponding pixels of binocular images need to satisfy strict geometrical relationships so that the binocular depth information can be obtained according to the binocular matching information. Although the above method for fusing the visible light image and the infrared image at the two-dimensional image level recovers the approximate structure of the image and the pixel intensity information, the errors and uncertainty factors in the fusion process may change the geometrical relationships between matching pixel pairs. In addition, because the slight change of the pixel intensity and the slight change of the local structure caused by the uncertainty factors of the fusion may lead to the increase of the matching cost among the corresponding pixel points, the matching precision is influenced.

Another mainstream multiband information fusion mode is the fusion of point cloud information obtained in multiple bands, i.e., the infrared binocular image and the visible light binocular image as well as the calibration data of the infrared binocular camera and the calibration data of visible light are used for respectively generating point cloud corresponding to the infrared band and the visible light band and the fusion of the multiband binocular point cloud is explored by means of rigid transformation between an infrared unit and a visible light unit and various point cloud registration and fusion algorithms. (Research on Integration Algorithm of Infrared and Visible 3D Point Cloud). The above method respectively matches the binocular cameras in different bands, maps the images into three-dimensional information according to matching results, and fuse the information on a point cloud level, thereby greatly increasing the calculation amount and resource consumption and making it difficult to apply to actual products.

The present invention proposes a confidence calculation method and a multiband disparity information fusion method. The confidence information of each pixel is obtained in the stereo matching process of each band image; and after each band binocular camera respectively obtains disparity information with confidence, the information is directly fused on a two-dimensional disparity diagram according to the confidence and then the depth information is calculated according to the fused disparity diagram. The confidence information is obtained in the process of binocular disparity estimation. The disparity is directly obtained according to a single band binocular image, thereby avoiding the matching errors introduced by image fusion among the bands; and the confidence information is obtained from intermediate variables without adding extra calculation overhead. In addition, depth information fusion does not need the operation of conversion between two dimensions and three dimensions and projection mapping optimization, and greatly increases the efficiency compared with fusion on the point cloud information.

SUMMARY

The present invention aims to overcome the defects of the prior art and provides a disparity fusion method for the all-weather depth estimation process of microview and multiband cameras, which uses different band binocular cameras to obtain respective corresponding scenario disparities and fuses disparity diagrams obtained by sensors under different modes based on confidence strategy to obtain all-weather, more complete and more accurate depth information.

The technical solution of the present invention is as follows:

A disparity image fusion method for multiband stereo cameras comprises the following steps:

1. Calibrating respective internal and external parameters of multiband binocular cameras, wherein the internal parameters comprise a focal length and an optical center, and the external parameters comprise rotation and translation; correcting binocular images outputted by the binocular cameras in different bands into a parallel equipotential relationship.

2. Jointly calibrating the multiband binocular cameras to obtain position relationship parameters among devices of different bands, comprising rotation and translation.

3. Registering the multiband binocular cameras to obtain a coordinate conversion matrix of corresponding pixels among images collected by the devices of different bands, i.e., a homography matrix.

4. Matching the binocular images according to a semi-global matching (SGM) method to obtain respective cost diagrams of the multiband binocular images; and calculating the confidence and the disparity of each pixel point according to the cost diagrams to obtain disparity diagrams with the confidence.

5. Fusing the disparity diagrams obtained by cameras under two modes according to the confidence, rotation and translation parameters and the homography matrix to obtain more complete and more accurate depth diagrams; calculating a depth diagram corresponding to the fused disparity according to calibration parameters and the triangulation measurement principle.

The present invention has the following beneficial effects: the present invention proposes a strategy for fusing the disparity diagrams obtained by different band devices based on multiband binocular depth estimation, so as to achieve complementary advantages of different band devices. The present invention has the following advantages:

(1) The present invention proposes a method for obtaining pixel disparity confidence information by using the intermediate output of binocular disparity estimation. The confidence information can be used to judge the disparity credibility of the position and assist disparity fusion. The confidence acquisition process makes full use of the intermediate output of calculation, and can be conveniently embedded into the traditional disparity estimation process, with high calculation efficiency and simple and easy operation.

(2) The present invention proposes a disparity fusion method for multiband stereo cameras. The disparity diagrams participating in the fusion are obtained according to the binocular images of the corresponding bands, which makes full use of the information of each band and simultaneously avoiding introducing uncertainty and errors. The strategy of fusing the disparity according to the confidence can select the accurate information of each band and achieve the purpose of complementary advantages of multiband devices.

DETAILED DESCRIPTION

Figure 1:
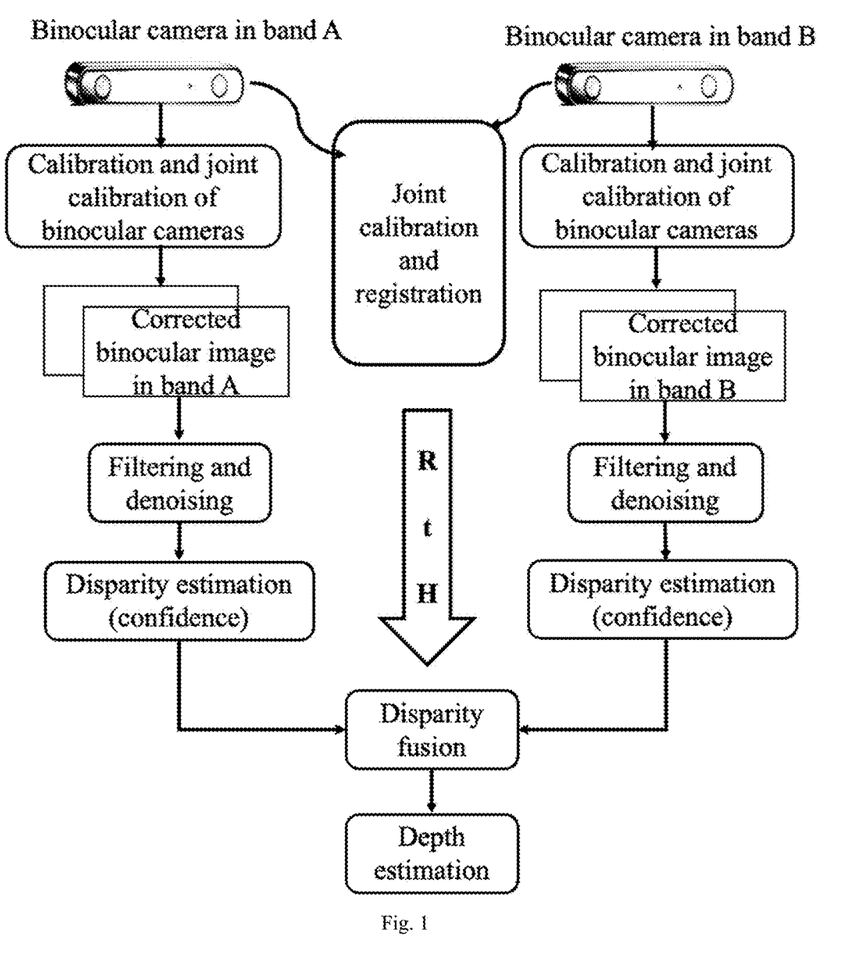
FIG. 1 is an overall flow chart of a solution.

The present invention fuses the disparity diagrams obtained based on a multiband device according to a multiband sensor device and a binocular disparity estimation method, and calculates distance information according to the triangulation measurement principle and the fused disparity to use the imaging advantages of devices of different bands under different environments. By taking the depth estimation of a pair of visible light binocular cameras and a pair of infrared binocular cameras as an example, a specific implementation solution is as follows:

FIG. 1 shows an overall flow of the solution.

I. The specific operation of a calibration and joint calibration module is as follows:

1. Respectively calibrating each lens of a visible light binocular camera and an infrared binocular camera and jointly calibrating the respective systems 1.1 Respectively calibrating the infrared camera and the visible light camera by the Zhangzhengyou calibration method to obtain internal parameters such as focal length and principal point position and external parameters such as rotation and translation of each camera.

1.2 Jointly calibrating the visible light binocular camera to obtain external parameters such as rotation and translation of two cameras of a binocular camera system; jointly calibrating the infrared binocular camera to obtain external parameters such as rotation and translation of two cameras of an infrared binocular system; correcting output image pairs according to the respective external parameters of the binocular camera system so that the binocular images outputted by the same binocular camera system satisfy the parallel equipotential relationship.

2. Jointly calibrating and registering the visible light binocular camera system and the infrared camera system 2.1 Jointly calibrating the left lens of the visible light binocular system and the left lens of the infrared binocular system by the Zhangzhengyou calibration method to obtain external parameters such as rotation and translation of the visible light camera and the infrared camera.

2.2 Simultaneously shooting the images of checkers in different planes by two pairs of binocular cameras, calculating the positional relationship of the same plane in the visible light image and the infrared image by using RT obtained by joint calibration and the detected checker corners, and representing the positional relationship with a homography matrix H.

Figure 2:
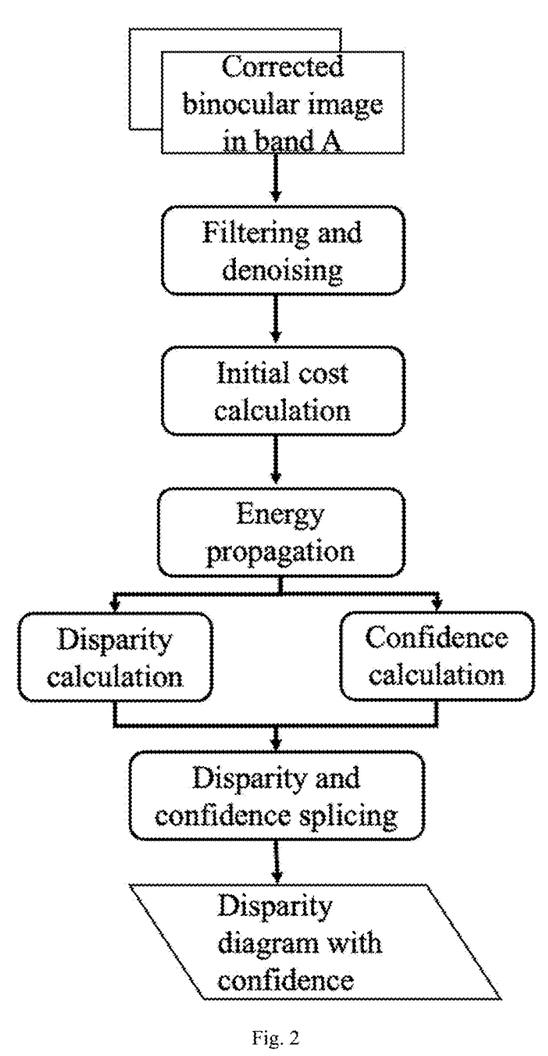
FIG. 2 shows a detailed flow of a disparity estimation module.

II. The specific flow of a disparity estimation module is shown in FIG. 2. The specific operation is as follows:

1 Denoising and filtering input images by a Gaussian filtering algorithm. The weight of a Gaussian filtering window is determined by a Gaussian function (formula 1).

$$h(x, y) = e^{-\frac{x^2+y^2}{2\sigma^2}} \quad (1)$$

wherein (x,y) is a point coordinate and a is a standard deviation. The Gaussian function is discretized to obtain a weight matrix, i.e., a Gaussian filter.

Through Gaussian filtering, noise can be effectively suppressed and the image is smoothed. Subsequent matching errors caused by the noise are prevented.

2. Matching the input images to obtain the disparity and the confidence. Stereo matching is mainly divided into the following processes: cost calculation, cost aggregation, confidence calculation and disparity calculation.

2.1 Firstly, conducting initial cost calculation. Sliding window matching based on Census features is taken as an example herein to describe the flow of matching cost calculation.

A Census feature descriptor of each pixel is obtained. A sliding window is used for search on a scanning line to calculate the cost corresponding to the possible disparity of each pixel (formula 2):

$$Cost_{d, d \in D_{max}}(x,y) = HD(CensusL(x,y), CensusR(x\ d,y)) \quad (2)$$

In the formula, HD(•) represents a Hamming distance, and CensusL and CensusR are respectively Census feature descriptors of a left diagram pixel and a right diagram pixel. The output of cost calculation is a tensor of size height (H)×width (W)×maximum disparity (D), i.e., the cost diagram.

2.2 Conducting energy propagation on the initial cost diagram to obtain an energy diagram. The energy is described as follows:

$$E(D) = \sum_p C(p, D_p) + \sum_{q \in N_p} P_1 T[|D_p - D_q| = 1] + \sum_{q \in N_p} P_2 T[|D_p - D_q| > 1]] \quad (3)$$

wherein $C(p,D_p)$ is the cost at position p when the disparity is $D_p$, $T[\bullet]$ is an indicator function, and the output is 1 when the input satisfies the conditions within [ ], otherwise, is 0. $P_1$ and $P_2$ are penalty terms. $D_q$ is a disparity value at position q.

According to formula 4, in accordance with the global structure of the image, the cost distribution information of surrounding pixels is transmitted to the center pixel from multiple directions.

$$L_r(p, d) = C(p, d) + \min\begin{pmatrix} L_r(p-r, d), L_r(p-r, d-1) + P_1, \\ L_r(p-r, d+1) + P_1, \\ \min_i L_r(p-r, i) + P_2 \end{pmatrix} - \min_k L_r(p-r, k) \quad (4)$$

$L_r(p,d)$ is aggregation energy when the disparity at position p is d, and r is a transfer direction.

Figure 3:
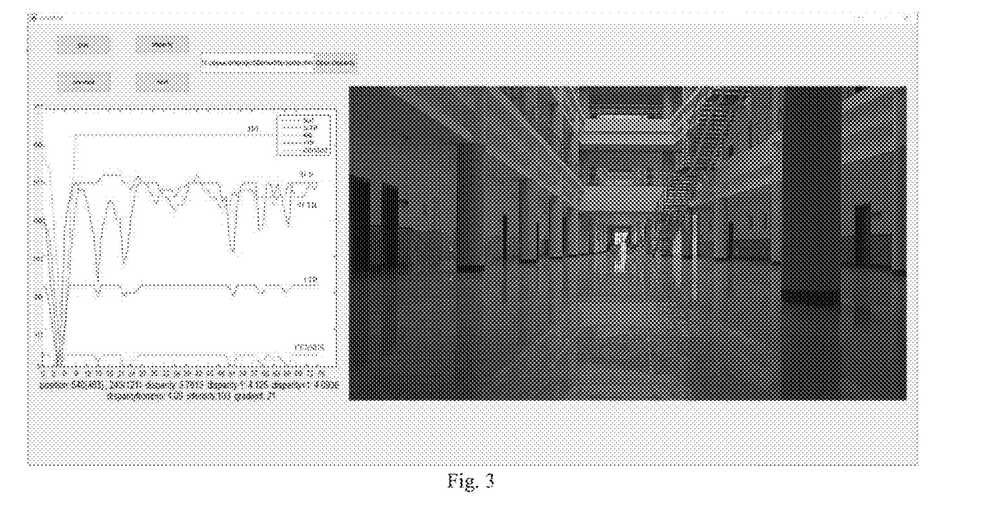
FIG. 3 is a schematic diagram of influence of energy propagation on cost distribution.

After energy propagation, a tensor of size height (H)×width (W)×maximum disparity (D), i.e., the energy diagram, is obtained. Energy propagation conducted successively in four directions of from top to bottom (TB), from left top to bottom right (LTB), from left to right (LR) and from right to left (RL) is taken as an example. The change of a cost curve of a pixel in the process of energy propagation is shown in FIG. 3.

2.3 Finding a disparity corresponding to minimum energy for each pixel position according to an energy propagation diagram, which is the integer disparity d(x,y) of the pixel.

$$d(x, y) = \arg\min_{i \in D_{max}} energy(i) \quad (5)$$

The energy (•) is the energy after aggregation.

2.4 Calculating a subpixel level disparity diagram by using the energy diagram and an integral pixel disparity diagram.

III. Confidence calculation

In the calculation process of the binocular disparity, the confidence information of each pixel disparity can be calculated by the energy diagram information according to various confidence strategies and the confidence information is encoded into a binary string and connected in series with the disparity to save the storage space. The present invention proposes a confidence calculation strategy which comprises the following specific operation:

1 Searching the cost vector corresponding to each pixel in the energy diagram to obtain the minimum cost $Cost_{min}$ corresponding to each pixel, corresponding disparity $d_{min}$, second minimum cost $Cost_{SecMin}$ and corresponding disparity $d_{SecMmin}$;

2 Calculating the absolute value of a difference between two disparities:

$$abs2dis = |d_{min} - d_{SecMin}| \quad (6)$$

3 Calculating a ratio between two energy values:

$$Rate2Energy = Cost_{min}/Cost_{SecMin} \quad (7)$$

4 Judging a size relationship between two quantities. When $abs2dis = thresh_1$, if $Rate2Energy < thresh_2$, the confidence is set as 1, otherwise as 0; and when $abs2dis > thresh_1$, if $Rate2Energy < thresh_{13}$, the confidence is set as 1, otherwise as 0. $thresh_1$, $thresh_2$ and $thresh_3$ are obtained by statistics and stored in hardware in advance.

IV. Filtering the obtained disparity diagram to remove invalid disparity.

Firstly, speckle filtering is conducted on the image to remove the outlier in the disparity diagram.

$$p(x, y) = \begin{cases} 0, & \sum_{(i,j) \in \Omega(x,y)} T[p(i, j) > (1+t) \cdot p(x, y) || p(i, j) < (1-t) \cdot p(x, y)] > t1 \\ p(x, y), & \text{other} \end{cases} \quad (8)$$

p(x,y) is a disparity value at position (x,y); t and t1 are thresholds, counted and obtained by experiments and stored in hardware in advance; $T[\bullet]$ is an indicator function; and the output is 1 when the input satisfies the conditions within [ ], otherwise, is 0. $\Omega(x,y)$ is a local region centered on (x,y).

Median filtering is conducted on the disparity diagram. $p(x,y) = median_{(i,j) \in \Omega(x,y)}(p(i,j))$ (9)

Figure 4:
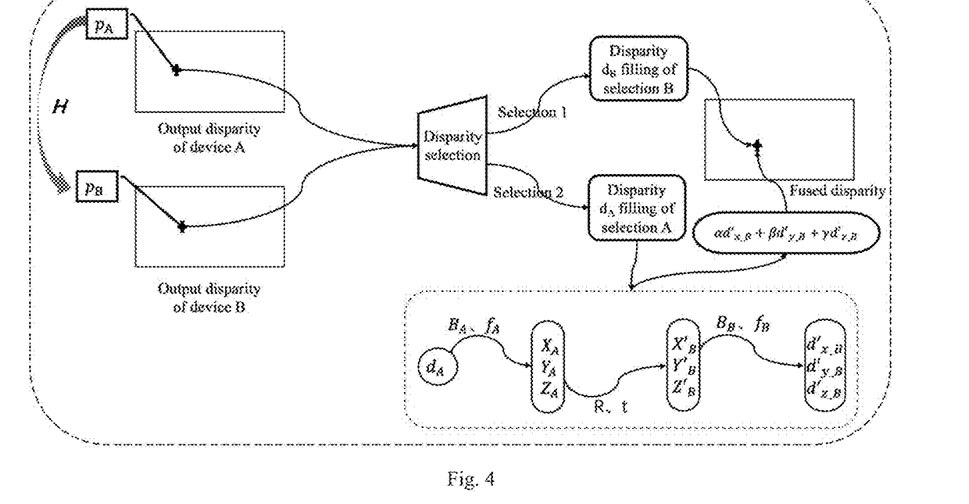
FIG. 4 shows a detailed flow of a disparity fusion module.

V. The specific operation of a disparity fusion module is as follows:

1. The disparity diagram $disparity_{vis}$ obtained by the visible light binocular camera and the disparity diagram $disparity_{ir}$ obtained by the infrared binocular camera are fused according to the homography matrix H, the translation and rotation positional relationships between the visible light system and the infrared system and two confidence marker bits. The specific operation is as follows:

1.1 Based on $disparity_{vis}$, the coordinate of $disparity_{ir}$ corresponding to each position is calculated according to the homography matrix, and a corresponding relationship between the coordinates of a pixel point $p_{vis}$ on $disparity_{vis}$ and a pixel point $p_{ir}$ matched with $p_{vis}$ on $disparity_{ir}$ is as follows:

$$p_{vis} = H \cdot p_{ir} \quad (10)$$

wherein H is the homography matrix formed by mapping the infrared disparity diagram to the visible light disparity diagram.

1.2 The disparity value and the confidence value of the matching point for the corresponding position are judged. If the disparity values of the corresponding positions of $p_{vis}$ and $p_{ir}$ are both 0, no processing is conducted and disparity fusion is ended. If one of the disparity values is 0, the value of the corresponding position of $disparity_{vis}$ is filled with non-zero party, and step 1.3 is conducted. If neither value is 0, the confidences of the corresponding positions of $P_{vis}$ and $p_{ir}$ are judged, and the corresponding position of $disparity_{vis}$ is filled with the larger confidence. Step 1.3 is conducted.

1.3 Firstly, the disparity $d_{ir}$ value corresponding to position $p_{ir}$ (the coordinate is represented as ($u_{ir}$, $v_{ir}$) under a corresponding pixel coordinate system) is transformed into a corresponding disparity value $d_{vis}$ under a visible light binocular camera coordinate system, and then position $P_{vis}$ (the coordinate is represented as ($u_{vis}$, $v_{vis}$) under the corresponding pixel coordinate system) is filled. The coordinate at position $P_{ir}$ under the corresponding camera coordinate system of the infrared device is represented as ($X_{ir}$, $Y_{ir}$, $Z_{ir}$).

$p_{ir}$ is converted to the infrared camera coordinate system:

$$\begin{cases} X_{ir} = \frac{Z_{ir}}{f_{ir}}(u_{ir} - cu_{ir}) \\ Y_{ir} = \frac{Z_{ir}}{f_{ir}}(v_{ir} - cv_{ir}) \\ Z_{ir} = \frac{B_{ir} \cdot f_{ir}}{d_{ir}} \end{cases} \quad (11)$$

wherein ($cu_{ir}$, $cv_{ir}$) is the principal point position of a reference image of the infrared device. $B_{ir}$ and $f_{ir}$ are respectively the baseline length and the focal length of the infrared device. $d_{ir}$ is a corresponding disparity value at position $p_{ir}$.

According to the positional relationship between the visible light system and the infrared system, $P_{ir}$ is converted to the visible light camera coordinate system:

$$[X'_{vis}, Y'_{vis}, Z'_{vis}]^T = R \cdot [X_{ir}, Y_{ir}, Z_{ir}]^T + t$$

($X'_{vis}$, $Y'_{vis}$, $Z'_{vis}$) is the coordinate obtained by converting the point $P_{ir}$ under the camera coordinate system of the infrared device to the camera coordinate system of the visible light device. R is the rotation relationship quantity between the infrared camera coordinate system and the visible light camera coordinate system, and t is the translation relationship quantity between the infrared camera coordinate system and the visible light camera coordinate system.

$$\begin{cases} X'_{vis} = \frac{Z'_{u\_vis}}{f_{vis}}(u_{vis} - cu_{vis}) \\ Y'_{vis} = \frac{Z'_{v\_vis}}{f_{vis}}(v_{vis} - cv_{vis}) \\ Z'_{vis} = \frac{B_{vis} \cdot f_{vis}}{d_{z\_vis}} \end{cases} \quad (12)$$

wherein ($cu_{vis}$, $cv_{vis}$) is the principal point position of a reference image of the visible light device. $B_{vis}$ and $f_{vis}$ are respectively the baseline length and the focal length of the visible light device. $d_{z\_vis}$ is a disparity value obtained according to the coordinate $Z'_{vis}$, $Z'_{u\_vis}$ is a depth obtained according to the coordinate $X'_{vis}$, and $Z'_{v\_vis}$ is a depth obtained according to the coordinate $Y'_{vis}$.

It can be obtained according to formula 12 that:

$$\begin{cases} Z'_{u\_vis} = \frac{X'_{vis} \cdot f_{vis}}{u_{vis} - cu_{vis}} \\ Z'_{v\_vis} = \frac{Y'_{vis} \cdot f_{vis}}{v_{vis} - cv_{vis}} \\ Z'_{vis} = \frac{B_{vis} \cdot f_{vis}}{d_{z\_vis}} \end{cases} \quad (13)$$

Thus, the disparity can be obtained according to formula 13:

$$\begin{cases} d_{u\_vis} = \frac{B_{vis} \cdot f_{vis} \cdot (u_{vis} - cu_{vis})}{X'_{vis} \cdot f_{vis}} \\ d_{v\_vis} = \frac{B_{vis} \cdot f_{vis} \cdot (v_{vis} - cv_{vis})}{X'_{vis} \cdot f_{vis}} \\ d_{z\_vis} = \frac{B_{vis} \cdot f_{vis}}{Z'_{vis}} \end{cases} \quad (14)$$

wherein $d_{u\_vis}$ is a disparity value obtained according to the X direction relationship, $d_{v\_vis}$ is a disparity value obtained according to the Y direction relationship, and $d_{z\_vis}$ is a disparity value obtained according to the Z direction relationship.

The disparity value that shall be filled at position v L vis is calculated.

$$d_{vis} = \alpha \cdot d_{u\_vis} + \beta \cdot d_{v\_vis} + \gamma \cdot d_{z\_vis} \quad (15)$$

wherein $\alpha + \beta + \gamma = 1$ and $\alpha$, $\beta$ and $\gamma$ are obtained through experiments.

$d_{vis}$ is filled in position $p_{vis}$.

Figure 5:
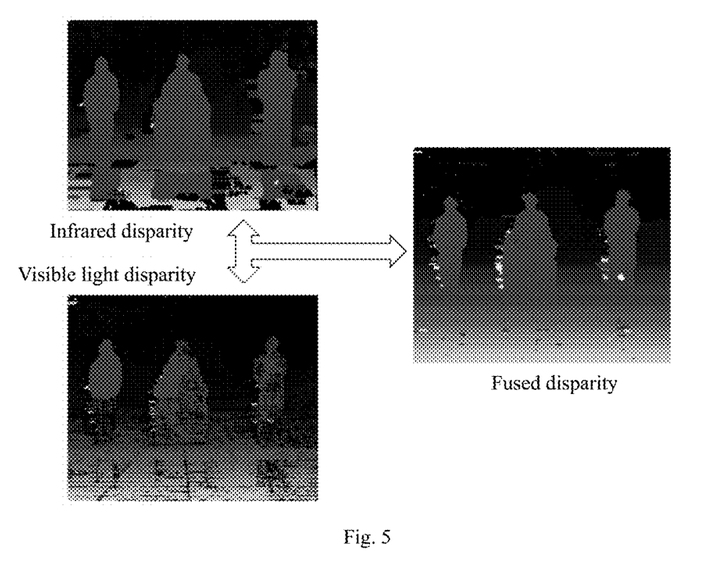
FIG. 5 is an effect diagram after disparity fusion.

Finally, the depth diagram is calculated according to the fused disparity, and the relationship formula between the disparity and the depth is as follows:

$$Z = \frac{B \times f}{d} \quad (16)$$

wherein B is baseline length, f is the focal length, Z is the depth and d is the disparity.

The invention claimed is:

1. A disparity image fusion method for multiband stereo cameras, comprising the following steps:
   (a) calibrating respective internal and external parameters of multiband binocular cameras, wherein the internal parameters comprise a focal length and an optical center, and the external parameters comprise rotation and translation; correcting binocular images outputted by the binocular cameras in different bands into a parallel equipotential relationship;
   (b) jointly calibrating the multiband binocular cameras to obtain position relationship parameters among devices of different bands, comprising rotation and translation;
   (c) registering the multiband binocular cameras to obtain a coordinate conversion matrix of corresponding pixels among images collected by the devices of different bands, wherein the coordinate conversion matrix is a homography matrix;
   (d) Matching the binocular images according to a semi-global matching (SGM) method to obtain respective cost diagrams of the multiband binocular images; and calculating the confidence and the disparity of each pixel point according to the cost diagrams to obtain disparity diagrams with the confidence;
   (e) fusing the disparity diagrams obtained by cameras under two modes according to the confidence, rotation and translation parameters and the homography matrix to obtain more complete and more accurate depth diagrams; calculating a depth diagram corresponding to the fused disparity according to calibration parameters and the triangulation measurement principle.

2. The disparity image fusion method for multiband stereo cameras according to claim 1, wherein the specific process of the SGM method is as follows:

(a-1) firstly, conducting initial cost calculation; when sliding window matching based on Census features is used, the process is:
obtaining a Census feature descriptor of each pixel, and using a sliding window for search on a scanning line to calculate the cost corresponding to the possible disparity of each pixel:

$$Cost_{d, d \in D_{max}}(x,y) = HD(CensusL(x,y), CensusR(x-d,y)) \quad (2)$$

in the formula, HD( ) represents a Hamming distance, and CensusL and CensusR are respectively Census feature descriptors of a left diagram pixel and a right diagram pixel; a tensor of size height ×width ×maximum disparity, which is the output of cost calculation, is the cost diagram;

(a-2) conducting energy propagation on an initial cost diagram to obtain an energy propagation diagram; the energy is described as follows:

$$E(D) = \sum_{p} C(p, D_p) + \sum_{q \in N_p} P_1 T[|D_p - D_q| = 1] + \sum_{q \in N_p} P_2 T[|D_p - D_q| > 1]] \quad (3)$$

wherein $C(p,D_p)$ is the cost at position p when the disparity is $D_p$, $T[\cdot]$ is an indicator function, and the output is 1 when the input satisfies the conditions within [ ]; otherwise, the output is 0; $P_1$ and $P_2$ are penalty terms; $D_q$ is a disparity value at position q;
according to formula (4), in accordance with the global structure of the image, the cost distribution information of surrounding pixels is transmitted to the center pixel from multiple directions;

$$L_r(p, d) = C(p, d) + \min\begin{pmatrix} L_r(p-r, d), L_r(p-r, d-1) + P_1, \\ L_r(p-r, d+1) + P_1, \\ \min_i L_r(p-r, i) + P_2 \end{pmatrix} - \min_k L_r(p-r, k) \quad (4)$$

$L_r(p,d)$ is aggregation energy when the disparity at position p is d; r is a transfer direction; i and k respectively represent disparity values i and k at position p and position p-r;
after energy propagation, a tensor of size height ×width ×maximum disparity is obtained to be an the energy propagation diagram;

(a-3) finding a disparity corresponding to minimum energy for each pixel position according to the energy propagation diagram, which is the integer disparity d(x, y) of the pixel;

$$d(x, y) = \arg \min_{i \in D_{max}} energy(i) \quad (5)$$

wherein the energy (·) is the energy after aggregation;

(a-4) calculating a subpixel level disparity diagram by using the energy propagation diagram and an integral pixel disparity diagram.

3. The disparity image fusion method for multiband stereo cameras according to claim 1, wherein the calculation method of the confidence specifically comprises:

(b-1) searching the cost vector corresponding to each pixel in the energy propagation diagram to obtain the minimum cost $Cost_{min}$ corresponding to each pixel, corresponding disparity $d_{min}$, second minimum cost $Cost_{SecMin}$ and corresponding disparity $d_{SecMin}$;

(b-2) calculating the absolute value of a difference between two disparities:

$$abs\,2dis = |d_{min} - d_{SecMin}| \quad (6)$$

(b-3) calculating a ratio between two energy values:

$$Rate2Energy = Cost_{min}/Cost_{SecMin} \quad (7)$$

(b-4) in judging a size relationship between abs2dis and Rate2Energy: when abs2dis=thresh$_1$, if Rate2Energy<thresh$_2$, the confidence is set as 1, otherwise as 0; when abs2dis>thresh$_1$, if Rate2Energy<thresh$_{13}$, the confidence is set as 1, otherwise as 0; wherein thresh$_1$, thresh$_2$ and thresh$_3$ are obtained by statistics and stored in hardware in advance.

4. The disparity image fusion method for multiband stereo cameras according to claim 1, wherein the disparity fusion method is: the disparity diagram disparity$_A$ obtained by a binocular system in band A and a disparity diagram disparity$_B$ obtained by a binocular system in band B are fused according to the homography matrix H, the translation and rotation positional relationships between the binocular system in band A and the binocular system in band B and two confidence marker bits, which is specifically operated as follows:

(c-1) based on disparity$_A$, calculating the coordinate of disparity$_B$ corresponding to each position according to the homography matrix, and a corresponding relationship between the coordinates of a pixel pointp$_A$ on disparity$_A$ and a pixel pointp$_B$ matched with p$_A$ on disparity$_B$ is as follows:

$$p_A = H \cdot p_B \quad (10)$$

wherein H is the homography matrix formed by mapping the disparity diagram obtained in band B to the disparity diagram obtained in band A;

(c-2) judging the disparity value and the confidence value of the matching point for the corresponding position; if the disparity values of the corresponding positions of p$_A$ and p$_B$ are both 0, no processing is conducted and disparity fusion is ended; if one of the disparity values is 0, the value of the corresponding position of disparity$_A$ is filled with non-zero party, and step (c-3) is conducted; if neither value is 0, the confidences of the corresponding positions of p$_A$ and p$_B$ are judged, and the corresponding position of disparity$_A$ is filled with the larger confidence; step (c-3) is conducted;

(c-3) firstly, transforming the disparity valued$_B$ corresponding to position p$_B$ into a corresponding disparity value d$_A$ under a binocular camera coordinate system in band A, and then filling position p$_A$; representing the coordinate at position p$_B$ under the corresponding camera coordinate system of the system in band B as (X$_B$, Y$_B$, Z$_B$); wherein the coordinate under the corresponding pixel coordinate system at position p$_B$ is represented as (u$_B$, v$_B$), and the coordinate under the corresponding pixel coordinate system at position p$_A$ is represented as (u$_A$, v$_A$);

converting $p_B$ to the B camera coordinate system:

$$\begin{cases} X_B = \dfrac{Z_B}{f_B}(u_B - cu_B) \\ Y_B = \dfrac{Z_B}{f_B}(v_B - cv_B) \\ Z_B = \dfrac{b_B \cdot f_B}{d_B} \end{cases} \quad (11)$$

wherein ($cu_B$, $cv_B$) is the principal point position of a reference image of device B;

$b_B$ and $f_B$ are respectively the baseline length and the focal length of the device B; $Z_B$ is the coordinate in Z direction at $p_B$; $d_B$ is a disparity value corresponding to position $p_B$;

according to the positional relationship between the system in band A and the system in band B, converting $p_B$ to the camera coordinate system of the system in band B:

$$[X'_A, Y'_A, Z'_A]^T = R \cdot [X_B, Y_B, Z_B]^T + t$$

($X'_A$, $Y'_A$, $Z'_A$) is the coordinate obtained by converting the point $p_B$ under the camera coordinate system of the device in band B to the camera coordinate system of the device in band A; R is a rotation relationship quantity between the camera coordinate systems of the device B and device A, and t is a rotation relationship quantity between the camera coordinate systems of the device B and the device A;

$$\begin{cases} X'_A = \dfrac{Z'_{u\_A}}{f_A}(u_A - cu_A) \\ Y'_A = \dfrac{Z'_{v\_A}}{f_A}(v_A - cv_A) \\ Z'_A = \dfrac{b_A \cdot f_A}{d_{z\_A}} \end{cases} \quad (12)$$

wherein ($cu_A$, $cv_A$) is the principal point position of a reference image of the device A; $b_A$ and $f_A$ are respectively the baseline length and the focal length of the device A; $Z'_{u\_A}$ is a depth value obtained from the coordinate $X'_A$; $Z'_{v\_A}$ is a depth value obtained from the coordinate $Y'_A$;

$d_{z\_A}$ is a disparity value obtained according to the coordinate $Z'_A$;

from formula (12), obtaining:

$$\begin{cases} Z'_{u\_A} = \dfrac{X'_A \cdot f_A}{u_A - cu_A} \\ Z'_{u\_A} = \dfrac{Y'_A \cdot f_A}{v_A - cv_A} \\ Z'_A = \dfrac{b_A \cdot f_A}{d_{z\_A}} \end{cases} \quad (13)$$

thus, from formula (13), obtaining the disparity:

$$\begin{cases} d_{u\_A} = \dfrac{b_A \cdot f_A \cdot (u_A - cu_A)}{X'_A \cdot f_A} \\ d_{v\_A} = \dfrac{b_A \cdot f_A \cdot (v_A - cv_A)}{Y'_A \cdot f_A} \\ d_{z\_A} = \dfrac{b_A \cdot f_A}{Z'_A} \end{cases} \quad (14)$$

wherein $d_{u\_A}$ is a disparity value obtained according to the X direction relationship, $d_{v\_A}$ is a disparity value obtained according to the Y direction relationship, and $d_{z\_A}$ is a disparity value obtained according to the Z direction relationship;

calculating the disparity value that shall be filled at position $p_A$:

$$d_A = \alpha \cdot d_{u\_A} + \beta d_{v\_A} + \gamma d_{z\_A} \quad (15)$$

wherein $\alpha + \beta + \gamma = 1$, and $\alpha$, $\beta$ and $\gamma$ are obtained through experiments;

filling $d_A$ in position $p_A$.

5. The disparity image fusion method for multiband stereo cameras according to claim 3, wherein the disparity fusion method is: the disparity diagram disparity$_A$ obtained by a binocular system in band A and a disparity diagram disparity$_B$ obtained by a binocular system in band B are fused according to the homography matrix H, the translation and rotation positional relationships between the binocular system in band A and the binocular system in band B and two confidence marker bits, which is specifically operated as follows:

(c-1) based on disparity$_A$, calculating the coordinate of disparity$_B$ corresponding to each position according to the homography matrix, and a corresponding relationship between the coordinates of a pixel point$p_A$ on disparity$_A$ and a pixel point$p_B$ matched with $p_A$ on disparity$_B$ is as follows:

$$p_A = H \cdot p_B \quad (10)$$

wherein H is the homography matrix formed by mapping the disparity diagram obtained in band B to the disparity diagram obtained in band A;

(c-2) judging the disparity value and the confidence value of the matching point for the corresponding position; if the disparity values of the corresponding positions of $p_A$ and $p_B$ are both 0, no processing is conducted and disparity fusion is ended; if one of the disparity values is 0, the value of the corresponding position of disparity$_A$ is filled with non-zero party, and step (c-3) is conducted; if neither value is 0, the confidences of the corresponding positions of $p_A$ and $p_B$ are judged, and the corresponding position of disparity$_A$ is filled with the larger confidence; step (c-1) is conducted;

(c-3) firstly, transforming the disparity valued$_B$ corresponding to position $p_B$ into a corresponding disparity value $d_A$ under a binocular camera coordinate system in band A, and then filling position $p_A$; representing the coordinate at position $p_B$ under the corresponding camera coordinate system of the system in band B as ($X_B$, $Y_B$, $Z_B$),wherein the coordinate under the corresponding pixel coordinate system at position $p_B$ is represented as ($u_B$, $v_B$), and the coordinate under the corresponding pixel coordinate system at position $p_A$ is represented as ($u_A$, $v_A$);

converting $p_B$ to the B camera coordinate system:

$$\begin{cases} X_B = \dfrac{Z_B}{f_B}(u_B - cu_B) \\ Y_B = \dfrac{Z_B}{f_B}(v_B - cv_B) \\ Z_B = \dfrac{b_B \cdot f_B}{d_B} \end{cases} \quad (11)$$

wherein ($cu_B$, $cv_B$) is the principal point position of a reference image of device B; $b_B$ and $f_B$ are respectively the baseline length and the focal length of the device B; $Z_B$ is the coordinate in Z direction at $p_B$; $d_B$ is a disparity value corresponding to position $p_B$;

according to the positional relationship between the system in band A and the system in band B, converting $p_B$ to the camera coordinate system of the system in band B:

$$[X'_A, Y'_A, Z'_A]^T = R \cdot [X_B, Y_B, Z_B]^T + t$$

$(X'_A, Y'_A, Z'_A)$ is the coordinate obtained by converting the point $p_B$ under the camera coordinate system of the device in band B to the camera coordinate system of the device in band A; R is a rotation relationship quantity between the camera coordinate systems of the device B and device A, and t is a rotation relationship quantity between the camera coordinate systems of the device B and the device A;

$$\begin{cases} X'_A = \dfrac{Z'_{u\_A}}{f_A}(u_A - cu_A) \\ Y'_A = \dfrac{Z'_{v\_A}}{f_A}(v_A - cv_A) \\ Z'_A = \dfrac{b_A \cdot f_A}{d_{z\_A}} \end{cases} \quad (12)$$

wherein $(cu_A, cv_A)$ is the principal point position of a reference image of the device A; $b_A$ and $f_A$ are respectively the baseline length and the focal length of the device A; $Z'_{u\_A}$ is a depth value obtained from the coordinate $X'_A$; $Z'_{v\_A}$ is a depth value obtained from the coordinate $Y'_A$; $d_{z\_A}$ is a disparity value obtained according to the coordinate $Z'_A$;

from formula (12), obtaining:

$$\begin{cases} Z'_{u\_A} = \dfrac{X'_A \cdot f_A}{u_A - cu_A} \\ Z'_{v\_A} = \dfrac{Y'_A \cdot f_A}{v_A - cv_A} \\ Z_{A'} = \dfrac{b_A \cdot f_A}{d_{z\_A}} \end{cases} \quad (13)$$

thus, from formula (13), obtaining the disparity:

$$\begin{cases} d_{u\_A} = \dfrac{b_A \cdot f_A \cdot (u_A - cu_A)}{X'_A \cdot f_A} \\ d_{v\_A} = \dfrac{b_A \cdot f_A \cdot (v_A - cv_A)}{Y'_A \cdot f_A} \\ d_{z\_A} = \dfrac{b_A \cdot f_A}{Z'_A} \end{cases} \quad (14)$$

wherein $d_{u\_A}$ is a disparity value obtained according to the X direction relationship, $d_{v\_A}$ is a disparity value obtained according to the Y direction relationship, and $d_{z\_A}$ is a disparity value obtained according to the Z direction relationship;

calculating the disparity value that shall be filled at position $p_A$;

$$d_A = \alpha \cdot d_{u\_A} \alpha \beta \cdot d_{v\_A} + \gamma \cdot d_{z\_A} \quad (15)$$

wherein $\alpha + \beta + \gamma = 1$ and $\alpha$, $\beta$ and $\gamma$ are obtained through experiments; filling $d_A$ in position $p_A$.

\* \* \* \* \*